(12) United States Patent
Jones

(10) Patent No.: US 6,514,078 B1
(45) Date of Patent: Feb. 4, 2003

(54) ELECTRONIC EDUCATIONAL DEVICE

(76) Inventor: Jacqueline E. Jones, 610 W. Anderson St., Selma, NC (US) 27576

( * ) Notice: Subject to any disclaimer, the term of this patent is extended or adjusted under 35 U.S.C. 154(b) by 0 days.

(21) Appl. No.: 10/004,174

(22) Filed: Nov. 2, 2001

(51) Int. Cl.[7] ............................................. A63H 33/30
(52) U.S. Cl. ..................... 434/81; 434/104; 434/318; 446/268; 446/270; 446/297; 446/397; 446/408
(58) Field of Search ................................ 434/311, 263, 434/198, 104, 318; 446/397

(56) References Cited

U.S. PATENT DOCUMENTS

| | | | |
|---|---|---|---|
| 3,319,357 A | | 5/1967 | Shreck et al. |
| 3,325,916 A | * | 6/1967 | Greenlee .................... 369/176 |
| D218,098 S | | 7/1970 | Halliburton |
| 3,732,632 A | * | 5/1973 | Dyer ...................... 235/88 M |
| 4,199,877 A | | 4/1980 | Akiyama |
| 4,245,404 A | | 1/1981 | Yoshinari |
| 4,400,161 A | | 8/1983 | Gerlt |
| 5,810,601 A | * | 9/1998 | Williams .................... 434/262 |
| 5,913,683 A | | 6/1999 | Rahmoune et al. |
| 5,999,895 A | * | 12/1999 | Forest ........................ 382/185 |
| 6,215,978 B1 | * | 4/2001 | Ruzic et al. ............ 273/153 R |
| 6,283,760 B1 | * | 9/2001 | Wakamoto .................. 348/564 |

* cited by examiner

Primary Examiner—Derris H Banks
Assistant Examiner—Dmitry Suhol

(57) ABSTRACT

An electronic educational device for entertaining and educating a preschooler, in particular. The electronic educational device includes a housing assembly including a tubular housing having a top end and a bottom end; and also includes a turntable drive assembly including a spindle being rotatably disposed through the top end of the tubular housing; and further includes a turntable member being mounted upon the spindle; and also includes at least one disk member being removably disposed about the turntable member and having pictures displayed thereupon; and further includes an audio system for describing the pictures displayed upon the at least one disk member.

1 Claim, 3 Drawing Sheets

ELECTRONIC EDUCATIONAL DEVICE

BACKGROUND OF THE INVENTION

1. Field of the Invention

The present invention relates to electronic educational tools and more particularly pertains to a new electronic educational device for entertaining and educating a preschooler, in particular.

2. Description of the Prior Art

The use of electronic educational tools is known in the prior art. More specifically, electronic educational tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,199,877; U.S. Pat. No. 4,245,404; U.S. Pat. No. 3,319,357; U.S. Pat. No. 4,400,161; U.S. Pat. No. Des. 218,098; and U.S. Pat. No. 5,913,683.

While these devices fulfill their respective, particular objectives and requirements, the aforementioned patents do not disclose a new electronic educational device. The inventive device includes a housing assembly including a tubular housing having a top end and a bottom end; and also includes a turntable drive assembly including a spindle being rotatably disposed through the top end of the tubular housing; and further includes a turntable member being mounted upon the spindle; and also includes at least one disk member being removably disposed about the turntable member and having pictures displayed thereupon; and further includes an audio system for describing the pictures displayed upon the at least one disk member.

In these respects, the electronic educational device according to the present invention substantially departs from the conventional concepts and designs of the prior art, and in so doing provides an apparatus primarily developed for the purpose of entertaining and educating a preschooler, in particular.

SUMMARY OF THE INVENTION

In view of the foregoing disadvantages inherent in the known types of electronic educational tools now present in the prior art, the present invention provides a new electronic educational device construction wherein the same can be utilized for entertaining and educating a preschooler, in particular.

The general purpose of the present invention, which will be described subsequently in greater detail, is to provide a new electronic educational device which has many of the advantages of the electronic educational tools mentioned heretofore and many novel features that result in a new electronic educational device which is not anticipated, rendered obvious, suggested, or even implied by any of the prior art electronic educational tools, either alone or in any combination thereof.

To attain this, the present invention generally comprises a housing assembly including a tubular housing having a top end and a bottom end; and also includes a turntable drive assembly including a spindle being rotatably disposed through the top end of the tubular housing; and further includes a turntable member being mounted upon the spindle; and also includes at least one disk member being removably disposed about the turntable member and having pictures displayed thereupon; and further includes an audio system for describing the pictures displayed upon the at least one disk member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electronic educational device which has many of the advantages of the electronic educational tools mentioned heretofore and many novel features that result in a new electronic educational device which is not anticipated, rendered obvious, suggested, or even implied by any of the prior art electronic educational tools, either alone or in any combination thereof.

It is another object of the present invention to provide a new electronic educational device which may be easily and efficiently manufactured and marketed.

It is a further object of the present invention to provide a new electronic educational device which is of a durable and reliable construction.

An even further object of the present invention is to provide a new electronic educational device which is susceptible of a low cost of manufacture with regard to both materials and labor, and which accordingly is then susceptible of low prices of sale to the consuming public, thereby making such electronic educational device economically available to the buying public.

Still yet another object of the present invention is to provide a new electronic educational device which provides in the apparatuses and methods of the prior art some of the advantages thereof, while simultaneously overcoming some of the disadvantages normally associated therewith.

Still another object of the present invention is to provide a new electronic educational device for entertaining and educating a preschooler, in particular.

Yet another object of the present invention is to provide a new electronic educational device which includes a housing assembly including a tubular housing having a top end and a bottom end; and also includes a turntable drive assembly including a spindle being rotatably disposed through the top end of the tubular housing; and further includes a turntable member being mounted upon the spindle; and also includes at least one disk member being removably disposed about the turntable member and having pictures displayed thereupon; and further includes an audio system for describing the pictures displayed upon the at least one disk member.

Still yet another object of the present invention is to provide a new electronic educational device that is easy and convenient to use.

Even still another object of the present invention is to provide a new electronic educational device that teaches kids words and other subjects.

Still another advantage of the present invention is to teach interactive learning through the use of sound effects and serve as device children operate to view learning disks.

Still yet another advantage of the device is that it would cover a wide range of topics from vocabulary and pronunciations to the importance of hygiene, animal life, nature, social skills, transportation, safety, and many more subjects of interest.

Still another advantage is that the device would help children to fine tune motor skills and concentration.

Still another use of this device is that it is easier to operate than some learning toys, ideal for user by the mentally challenged population and children who have moderate and severe learning disabilities. It will also sharpen a child's skills and give them a head start.

The interchangeable plastic disk inserts imprinted with pictures of various items could feature themes, such as, "Things to keep me clean". Each disk will have a title as indicated here.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
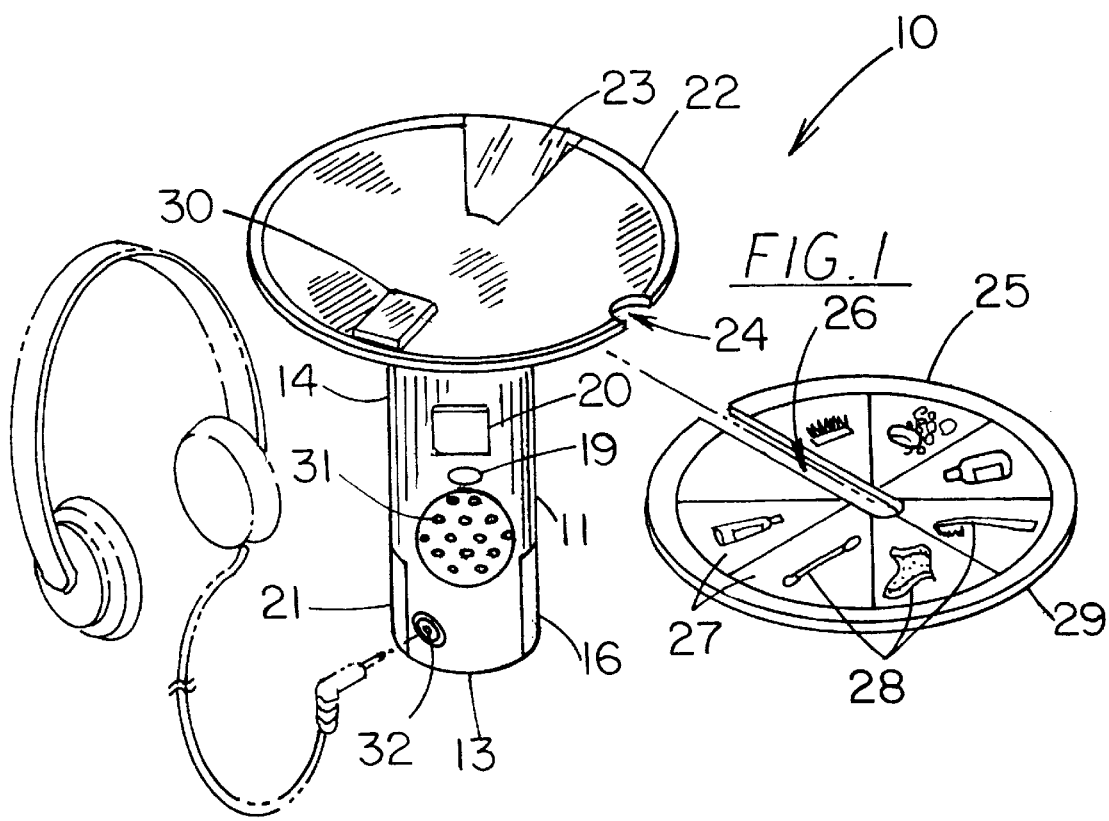
FIG. 1 is a perspective view of a new electronic educational device according to the present invention.
Figure 2:
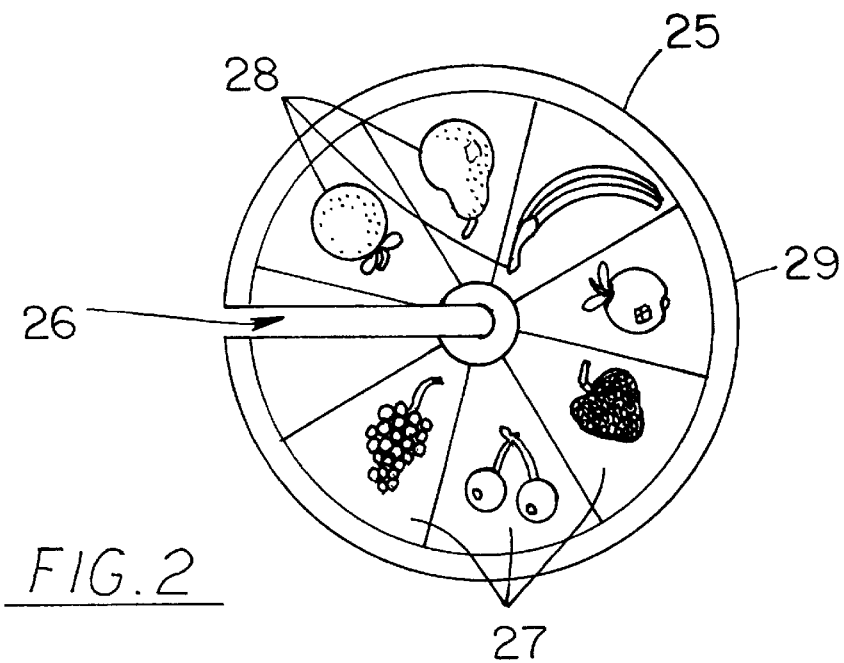
FIG. 2 is a top plan view of one of the information-containing disks of the present invention.
Figure 3:
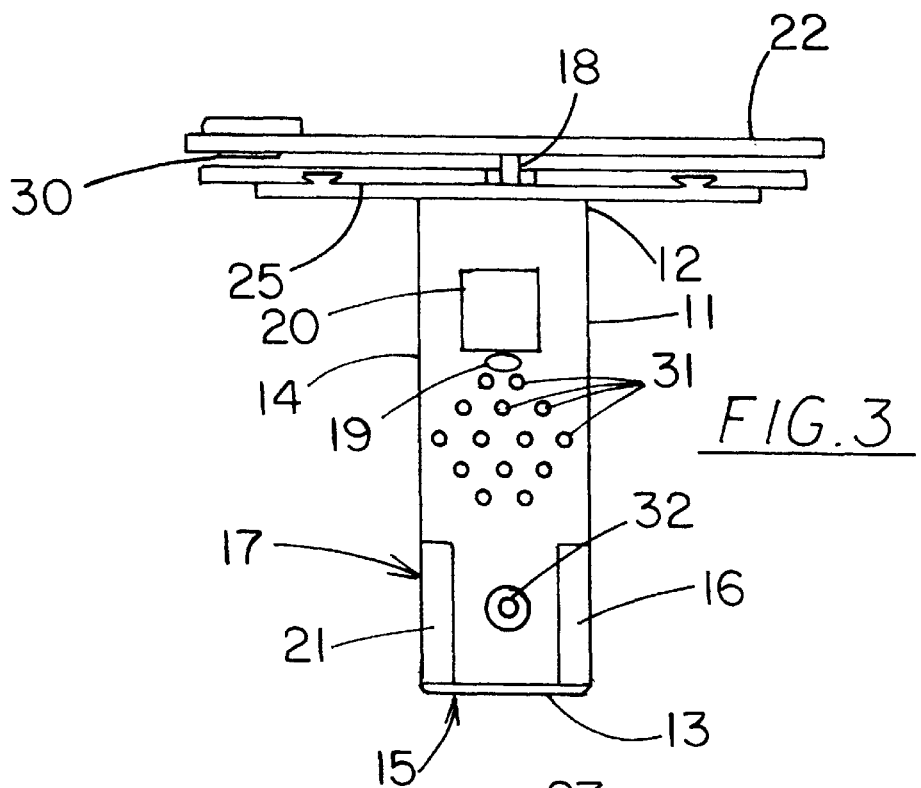
FIG. 3 is a side elevational view of the present invention.
Figure 4:
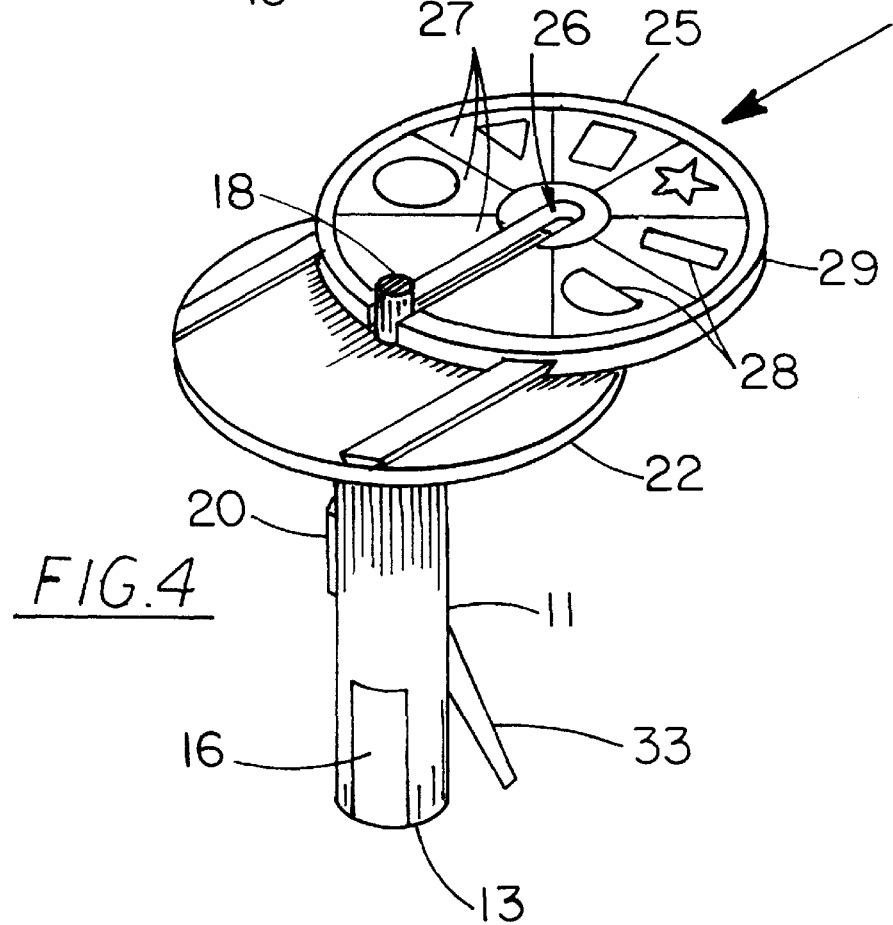
FIG. 4 is another perspective view of the present invention.
Figure 5:
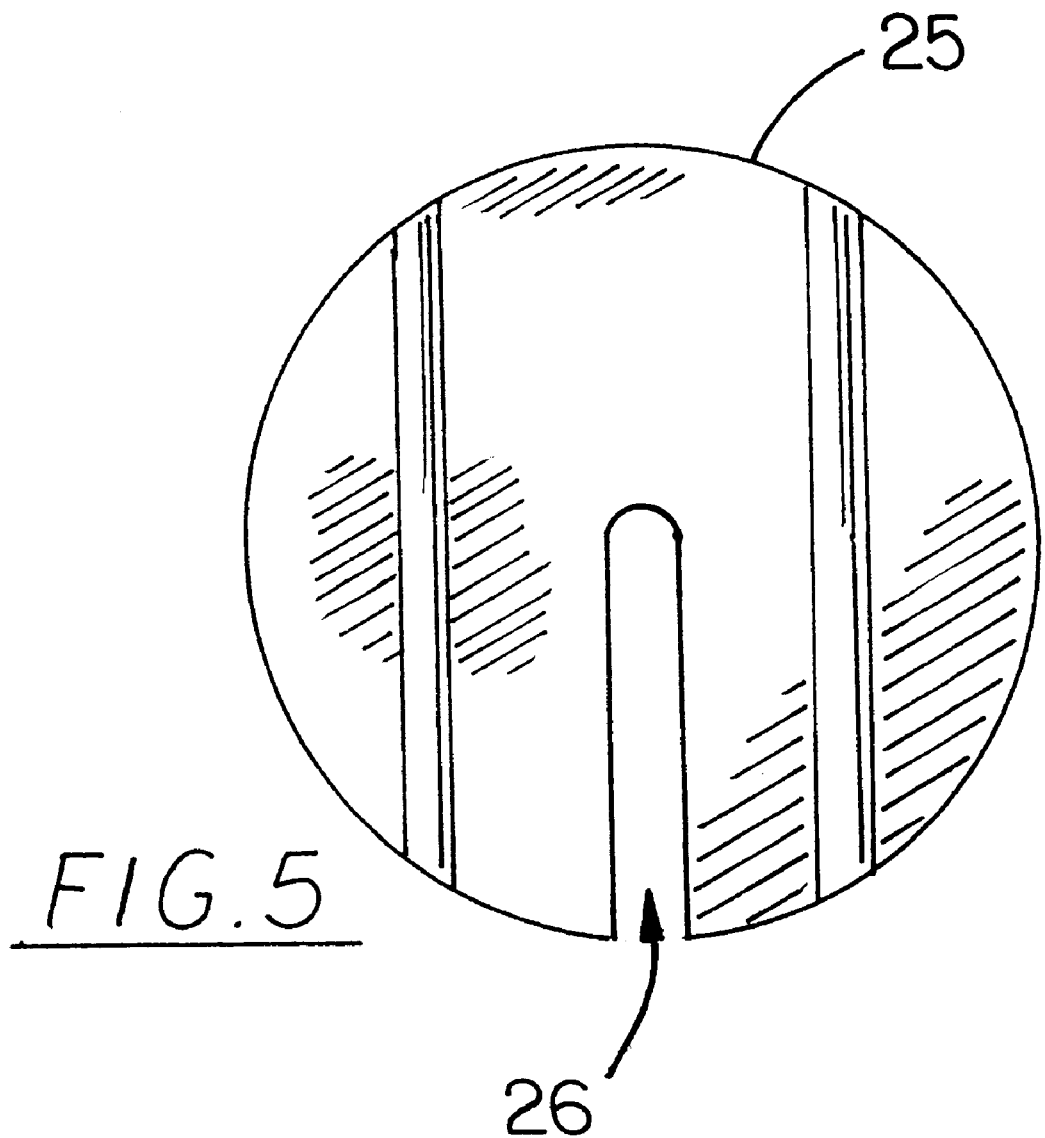
FIG. 5 is a bottom plan view of the present invention.

With reference now to the drawings, and in particular to FIGS. 1 through 5 thereof, a new electronic educational device embodying the principles and concepts of the present invention and generally designated by the reference numeral 10 will be described.

As best illustrated in FIGS. 1 through 5, the electronic educational device 10 generally comprises a housing assembly including a tubular housing 11 having a top end 12 and a bottom end 13. The tubular housing 11 also includes an opening 15 through the bottom end 13 and further includes a battery compartment 17 disposed near the bottom end 13 thereof. The housing assembly further includes a cover member 16 being removably attached over the opening 15 in the tubular housing 11.

A turntable drive assembly includes a spindle 18 being rotatably disposed through the top end 12 of the tubular housing 11. The turntable drive assembly further includes a motor 19 being conventionally disposed in the tubular housing 11 and being conventionally connected to the spindle 18 for the rotation thereof. The turntable drive assembly also includes a switch member 20 being movably and conventionally attached to a wall 14 of the tubular housing 11 and being conventionally connected to the motor 19 for the energizing of the motor 19. The switch member 20 also allows the user to ad just the wheel for upright positioning on a flat surface such as a tabletop. The turntable drive assembly further includes at least one battery 21 being removably disposed in the tubular housing 11 and being conventionally connected to the motor 19 and to the switch member 20. A turntable member 22 is conventionally mounted upon the spindle 18. The turntable member 22 includes a radial window 23 being disposed therein and also a notch 24 being disposed in a circumference thereof.

One or more disk members 25 are removably disposed about the turntable member 22 and have pictures 28 conventionally displayed thereupon. The one or more disk members 25 each have a radial slot 26 extending through a circumference and terminating at a center of the disk member 25 and removably receive a portion of the spindle 18 therein. The one or more disk members 25 are divided into a plurality of radial segments 27 each of which has a picture 28 of an object or item including food and personal hygiene products being displayed thereupon and being displayable through the radial window 23 of the turntable member 22. The one or more disk members further have a plurality of sound chips 29 being conventionally disposed upon the radial segments 27 and identifying the pictures 28 displayed thereupon. The one or more disk members 25 are removably inserted between the top end 12 of the tubular housing 1l1 and the turntable member 22.

An audio system for describing the pictures 28 displayed upon the one or more disk members 25 includes a speaker 31 being conventionally disposed in the tubular housing 11, and also includes a sound chip reader and player 30 being conventionally disposed upon the turntable member 22 and being conventionally connected to the speaker 31 for reading and playing information contained in the sound chips 29, and further includes an earphone jack 32 being conventionally disposed in the wall 14 of the tubular housing 11 and being connected to the speaker 31.

In use, the user inserts a disk member 25 about the turntable member 22, and turns on the audio system, which reads and plays the sound chip 29, which describes the picture 28 being shown through the radial window 23 of the turntable member 22. A user could also flip out the leg stand 33 for the purpose of allowing the present invention to sit upright on a supporting surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic educational device comprising:

a housing assembly including a tubular housing having a top end and a bottom end said tubular housing also including an opening through said bottom end and a battery compartment disposed near said bottom end thereof, said housing assembly further including a cover member being removably attached over said opening in said tubular housing;

a turntable drive assembly including a spindle being rotatably disposed through said top end of said tubular housing, said turntable drive assembly further including a motor being disposed in said tubular housing and being connected to said spindle for the rotation thereof, and also including a switch member being movably attached to a wall of said tubular housing and being connected to said motor for the energizing of said motor, and further including at least one battery being removably disposed in said tubular housing and being connected to said motor and to said switch member;

a turntable member being mounted upon said spindle, said turntable member including a transparent radial window being disposed therein and also a notch being disposed in a circumference thereof exposing a portion of said at least one disk member positioned between said top end of said housing and said turntable member for permitting finger gripping of said portion of said at least one disk member to remove said at least one disk member from said turntable member;

at least one disk member being removably positionable between said top end of said housing and said turntable member and having pictures displayed thereupon, said disk member comprising, a substantially circular plate such that said pictures thereon are displayed through said radial window of said turntable member when said turntable member is rotated by said spindle, said at least one disk member having a radial slot extending through a circumference and terminating at a center of said at least one disk member and removably receiving a portion of said spindle therein, said at least one disk member being divided into a plurality of radial segments each of which has a respective said picture of an object or item including food and personal hygiene products being displayed thereupon and being displayable through said radial window of said turntable member, said at least one disk member further having a plurality of sound chips being displayed upon said radial segments and identifying said pictures displayed thereupon, said at least one disk member being removably inserted between said top end of said tubular housing and said turntable member; and an audio system for describing said pictures displayed upon said at least one disk member, said audio system including a speaker being disposed in said tubular housing, and also including a sound chip reader and player being disposed upon said turntable member and being connected to said speaker for reading and playing information contained in said sound chips, and further including an earphone jack being disposed in said wall of said tubular housing and being connected to said speaker.

* * * * *